United States Patent [19]

Cross et al.

[11] 4,378,564
[45] Mar. 29, 1983

[54] INK JET PRINTING APPARATUS AND PROCESS

[75] Inventors: Grant P. Cross, Bedford; Robert Kagy, Arlington, both of Tex.

[73] Assignee: Printos B.V. of N.L., Naarden, Netherlands

[21] Appl. No.: 243,240

[22] Filed: Mar. 13, 1981

[30] Foreign Application Priority Data

Mar. 14, 1980 [GB] United Kingdom ............... 8008797

[51] Int. Cl.³ .......................................... G01D 15/18
[52] U.S. Cl. ...................................... 346/75; 106/20; 346/140 R; 400/126
[58] Field of Search ...................... 346/140 R, 75, 1.1; 106/20, 22; 101/35, 1; 400/126

[56] References Cited

U.S. PATENT DOCUMENTS

| 3,266,526 | 8/1966 | Berg | 138/103 |
|---|---|---|---|
| 3,584,571 | 6/1971 | Schmoll | 101/1 |
| 3,653,596 | 4/1972 | Abrams | 239/571 |
| 3,717,722 | 2/1973 | Messner | 118/624 X |
| 3,972,474 | 8/1976 | Keor | 346/75 X |
| 4,002,230 | 1/1977 | Schweppe | 346/75 X |
| 4,150,997 | 4/1979 | Hayes | 106/20 X |
| 4,215,350 | 7/1980 | Mielke | 346/75 |

Primary Examiner—Joseph W. Hartary
Attorney, Agent, or Firm—Robert A. Felsman; Charles D. Gunter

[57] ABSTRACT

An ink jet printing apparatus is shown which has a source of pressurized ink connected to a plurality of solenoid valves. Each valve has an input port in fluid communication with the pressurized ink source and an output port. A plurality of jeweled orifice nozzles are provided, each of the nozzles being in fluid communication with a select one of the output ports of the solenoid valves. Electrical control means control the output of the solenoid valves to the nozzles.

In the ink jet printing process shown, a source of water-based pressurized ink is prepared and utilized in the apparatus which contains 60 to 95 percent by weight water, 0.05 to 25 percent by weight dye, and 2.5 to 20 percent by weight of a glycol ether selected from the group consisting of butyl cellosolve, butyl carbitol, and mixtures thereof.

3 Claims, 7 Drawing Figures

INK JET PRINTING APPARATUS AND PROCESS

BACKGROUND OF THE INVENTION

This invention relates generally to ink jet printing and specifically to an ink jet printing apparatus and method for printing alpha-numeric characters onto a moving surface, such as containers moving along a conveyor.

Ink jet printing devices can be broadly divided into two categories, continuous and so called "on-demand" technology. In continuous ink jet printing devices, an ink manifold houses a piezoelectric crystal which vibrates upon application of an electric signal. The vibrations force ink out a nozzle past an electrode which charges selected drops. The ink stream continues through charged plates where the charged particles are deflected upward onto a target. The unchanged drops fall into a collection tray and are recirculated. Such devices are generally used for high speed printing with quality comparable to a typewriter and all rely upon a continuous, synchronized stream of ink drops.

On-demand ink jet printing devices utilize some variation of a technique in which ink drops are issued only on demand rather than in a continuous stream. Typically, there is provided a plurality of nozzles through which ink can be intermittently selectively ejected. Prior devices of this kind have generally comprised either piezoelectric ejector means associated with each nozzle for ejecting ink therethrough or an electrically operated needle valve or plunger for opening and closing each nozzle. In either case, the apparatus is relatively complex and uses only parts which have to be specially manufactured with the result that the apparatus tends to be extremely costly. Such devices were not well suited for the packaging industry where larger characters, for instance, characters having a height of from 13 mm to 70 mm are printed on containers moving down a conveyor line. There has existed a need, therefore, for a device which is simple and robust in construction, and which can be manufactured using commercially available parts to withstand the rigors of a packaging or assembly line environment.

In addition, a problem has existed in on-demand devices in providing a suitable ink which will not dry in the ink jet nozzles during their intermittent operation, yet which has good wetting properties on the printing substrate and a suitable viscosity. Certain of the designs previously suggested, although simpler in construction, did not prove satisfactory in operation because of the failure to match ink with apparatus.

SUMMARY OF THE INVENTION

It is, therefore, an object of the present invention to provide an ink jet printing apparatus suitable for printing large size alpha-numeric characters on a moving surface which apparatus is simple and dependable in operation and economical to construct.

Another object of the invention is to provide an ink jet printing process which utilizes an ink matched to the apparatus to provide satisfactory wetting of the printing substrate without drying in the apparatus nozzles.

The improved ink jet printing apparatus of this invention includes a source of pressurized ink and a plurality of valves, each of the valves having an input port which is in fluid communication with the pressurized ink source and an output port. A plurality of jeweled orifice nozzles are provided, each of which is in fluid communication with a select one of the output ports of the valves. Control means control the output of the ink from the valves to the nozzles.

In the preferred embodiment, an ink manifold communicates with the pressurized ink source. A plurality of solenoid valves have input ports which are connected by means of fluid conduits to the ink manifold. The output ports of the solenoid valves are connected by means of fluid conduits to the jeweled nozzles. The nozzle orifices are in the range of 0.025 mm to 0.215 mm in diameter.

In the ink jet printing process, a source of pressurized water-based ink is prepared which comprises 60 to 95 percent by weight water, 0.05 to 25 percent by weight dye, and 2.5 to 20 percent by weight glycol ether. The pressurized ink source is connected to a plurality of solenoid valves which are in turn connected to individual jeweled orifice nozzles. An electrical control means controls the output of the solenoid valves to the nozzles. The glycol ether is preferably a mixture of 2 to 8 percent by weight butyl cellosolve and 2 to 8 percent by weight butyl carbitol, said percentages being based on the total weight of the water-based ink. The relative proportions of the glycol ethers are selected to produce an ink having a viscosity in the range of 1.4 to 3.2 centipoise.

Additional objects, features, and advantages of the invention will be apparent in the following description.

DETAILED DESCRIPTION OF THE INVENTION

Figure 1:
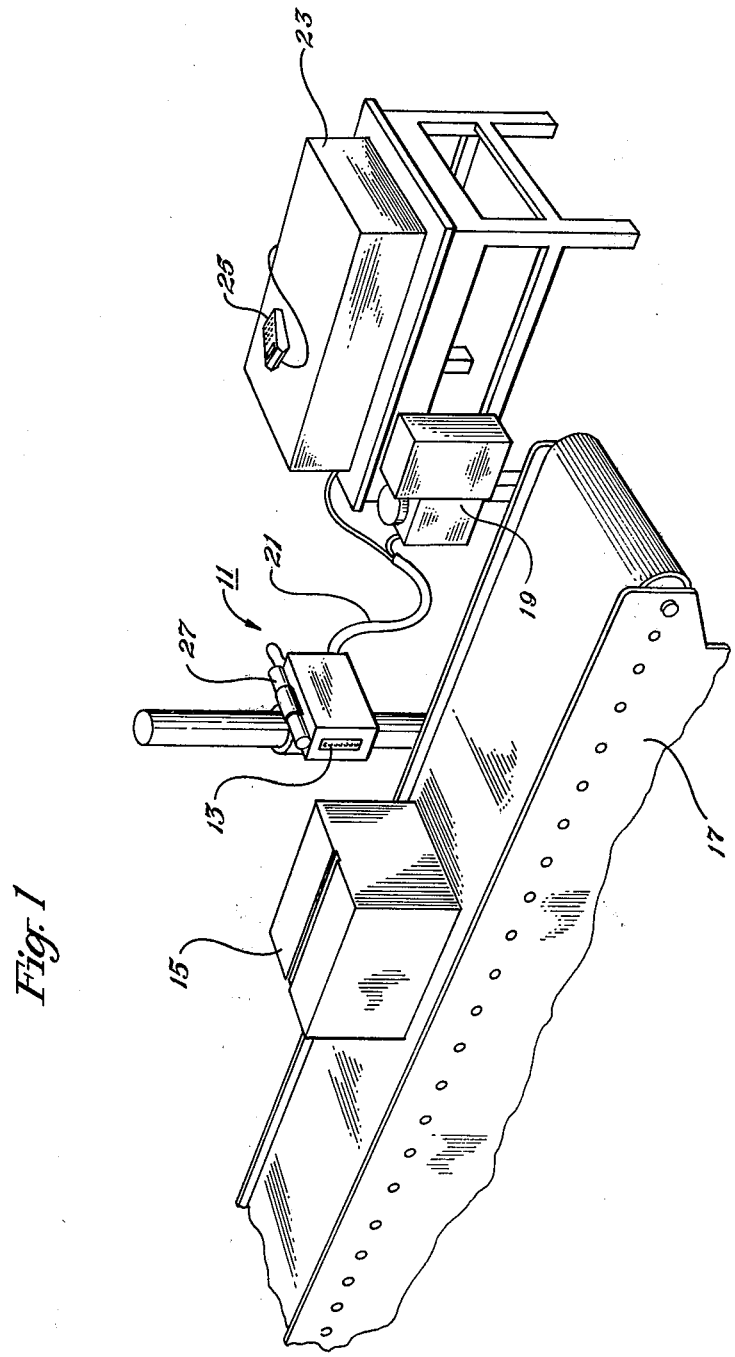
FIG. 1 is a perspective view of the ink jet printing apparatus installed on a conveyor line.

Referring now to FIG. 1, there is shown an ink jet printing apparatus of the present invention in place on a packaging line. A print head, designated generally as 11, has a plurality of nozzles 13 used to print alphanumeric characters onto a container 15 as the container moves down a conveyor 17. A source of pressurized ink 19 communicates by means of an ink line 21 with the print head 11. A microcomputer 23 selectively controls the ejection of ink from nozzles 13 onto container 15 in response to a message input device 25 programmed by the operator. A photocell 27 is used to detect the leading edge of the container as it passes in front of the print-head 11 to cause subsequent printing.

Figure 2:
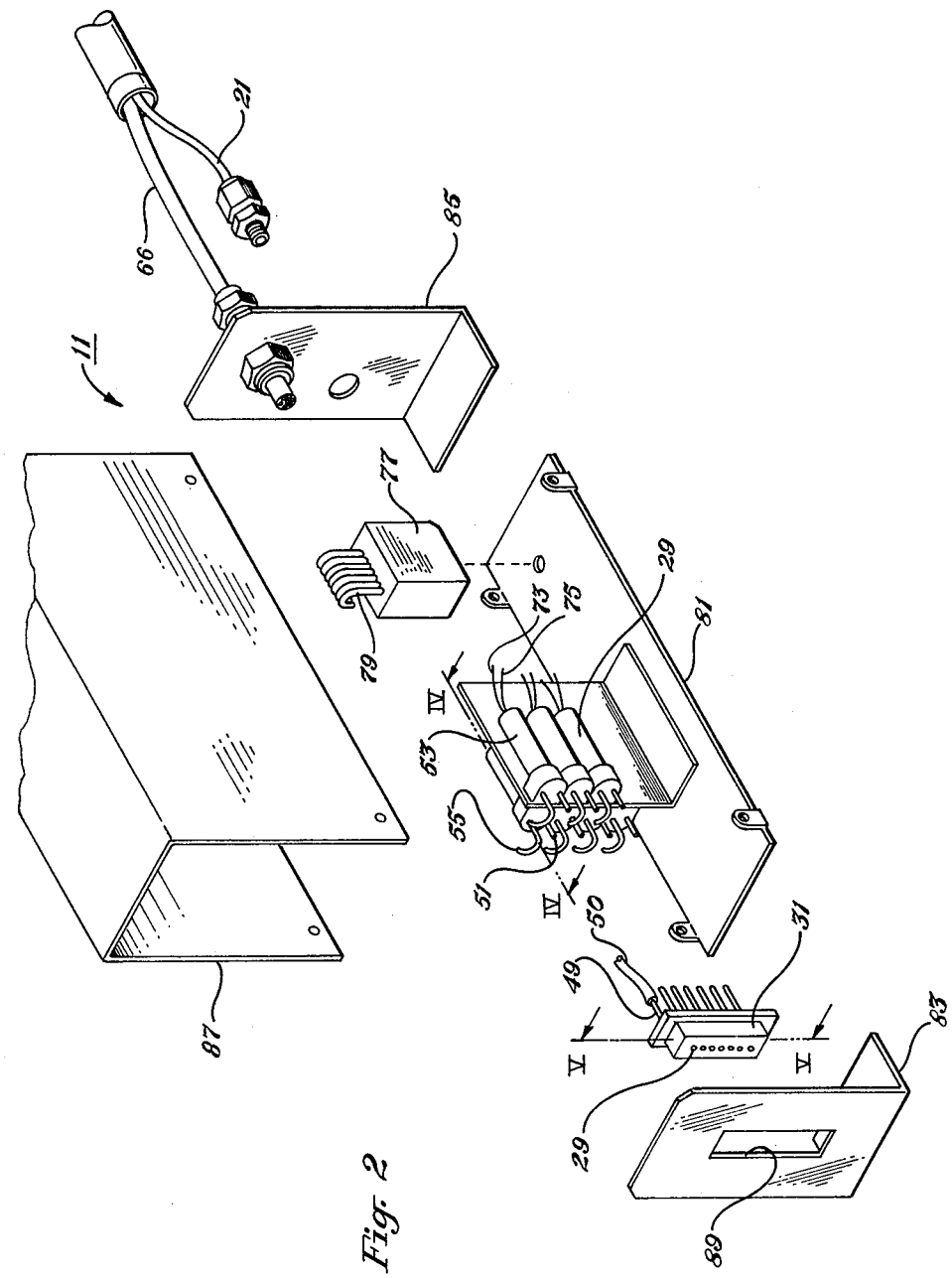
FIG. 2 is an exploded view of the print head of the device of FIG. 1.

As shown in FIG. 2, the print head 11 has a plurality of nozzles 29 provided in a common nozzle block 31. Preferably, the nozzles are arranged in a single column in alignment with and at equally spaced intervals from one another although other arrangements are possible such as arranging the alternate nozzles in two columns parallel with one another.

Figure 6:
FIG. 6 is a front isolated view of one of the nozzles used in the nozzle blocks.
Figure 5:
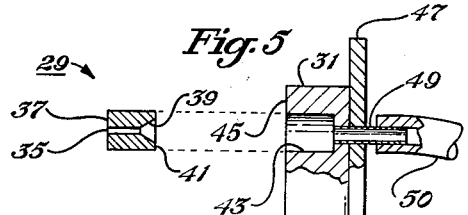
FIG. 5 is a cross-sectional view of the nozzle block of the print head taken along lines V—V in FIG. 2.

Each nozzle 29 comprises a single aperture for the passage of ink. Alternatively, each nozzle 29 can comprise a plurality of apertures which provide the same cross-sectional area as the single aperture. The nozzles 29 are preferably jeweled orifice nozzles such as the sapphire jewels used in acetylene torches and the like. Each jeweled orifice nozzle 29 as shown in FIGS. 5 and 6 has a generally circular body 33 having an orifice 35 of relatively smaller diameter on one face 37 and an opening 39 of relatively greater diameter on the opposite face 41. The diameter of orifice 35 is in the range of 0.025 mm to 0.215 mm, and preferably is in the range of 0.145 mm to 0.185 mm.

Each nozzle 29 is set in a nozzle block 31 preferably made of an inert material such as a suitable plastic. The nozzle block 31 has a series of generally circular recesses 43 having an internal diameter selected to receive the external diameter of the nozzle body 33. Recesses 43 are of sufficient depth to allow the nozzles 29 to fit flush with the top surface 45 of the block 31 when the nozzles are in place. The nozzles 29 are placed in recesses 43 with the opening 39 being first to enter the recess 43. The distance between the center of each orifice 35 when the orifices are vertically aligned is in the range of 0.01 mm to 5.0 mm and preferably is in the range of 0.05 mm to 0.50 mm.

The nozzle block 31 is backed by a longitudinal strip 47. A series of rigid tubes 49 leading from the nozzle recesses 43 project outward from the side of strip 47 opposite nozzle block 31. Tubes 49 and hence nozzles 29 are each in fluid communication with the output port 51 of a valve 53 (FIG. 2), located within the print head 11 by means of fluid conduits 50. Conduits 50 are of any suitable commercially available conduit, e.g., of metal or plastic material and are preferably in the range of 0.127 mm to 1.270 mm in diameter.

Figure 4:
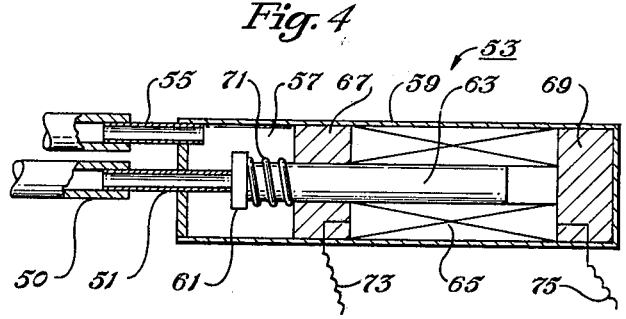
FIG. 4 is a cross-sectional view of a valve used in the print head taken along lines IV—IV in FIG. 2.

Valves 53 may be any suitable commercially available fast acting valve having an electrical cycle time in the range of from 0.1 to 10 milliseconds, preferably in the range of 1.0 to 4.5 milliseconds. Suitable valves can be either a single-acting spring return, a double acting electromagnetic solenoid valve or a piezoelectric valve. Preferably a single-acting spring return solenoid valve such as shown in FIG. 4 is used. Such a valve 53 typically has an output port 51 and an input port 55 leading to a fluid chamber 57 within an outer housing 59. A plunger 61 closes off output port 51 when in the position shown and has an elongated body 63 which is slidably received within a solenoid coil 65, held in place by mounting collars 67, 69. The solenoid coil 65 and valve housing 59 are preferably coated with a suitable epoxy resin to prevent ink fluid damage.

The solenoid coil 65 when energized exerts an electromagnetic force on plunger body 63 to cause the plunger 61 to move out of sealing engagement with output port 51, allowing ink to flow out the output port. A spring 71 mounted between collar 67 and plunger 61 urges the plunger 61 into sealing engagement with output pore 51 and thus prevents the flow of ink from fluid chamber 57 when solenoid coil 65 is de-energized. Wires 73, 75 run from solenoid coil 65 to the control circuit of the microcomputer 23 by means of a data cable 66 (FIG. 2).

Figure 3:
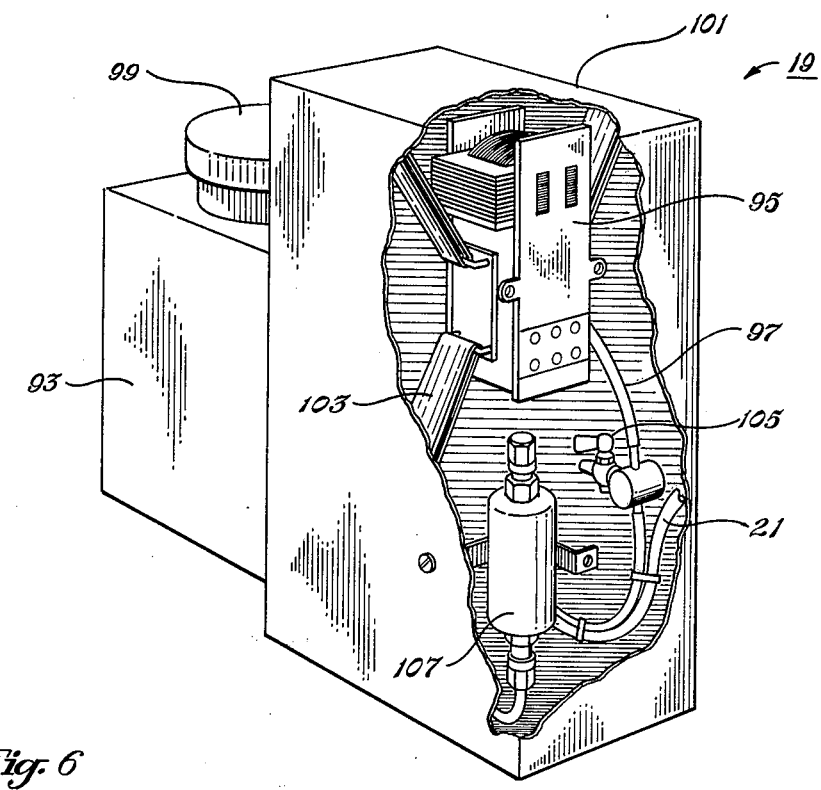
FIG. 3 is a close-up view of the ink source of the device of FIG. 1 partially broken away.

The input ports 55 of valves 53 are each in fluid communication with a common ink manifold 77 by means of fluid conduits 79 which are similar to conduits 50. Ink manifold 77 communicates with the pressurized ink source 19 (FIGS. 1 and 3) by means of ink line 21. The components of the print head 11 are conveniently housed within a generally rectangular box including bottom 81, end pieces 83, 85, and top 87. End piece 83 has a centrally located slot 89 adapted to receive nozzle block 31.

The pressurized ink source 19 (FIG. 3) comprises a reservoir 93 which can be pressurized to supply ink under pressure to ink manifold 77 by way of ink line 21. Pressure means such as vibrator pump 95 supply air pressure through a hose 97 to reservoir 93 which is filled with ink from the top by means of cap 99. Pump 95 is suspended within reservoir housing 101 by means of resilient bands 103. A vent valve 105 in air hose 97 allows the air pressure to reservoir 93 to be adjusted. Air pressure in the range of 0.5 to 7 psi is acceptable for the present purpose. A filter 107 can be utilized to filter the ink passing through ink line 21 to manifold 77.

Figure 7:
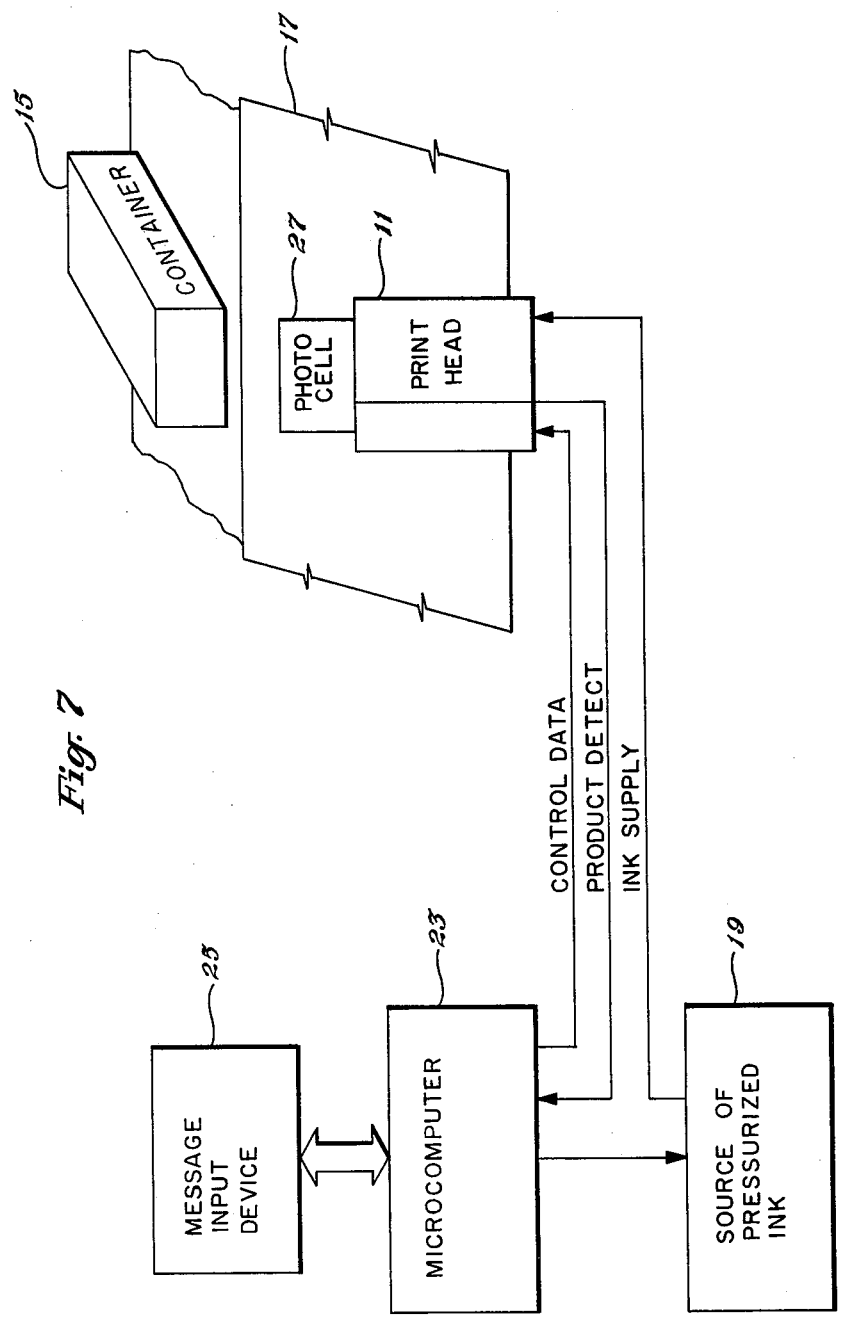
FIG. 7 is a schematic of the electrical control circuit of the apparatus of FIG. 1.

The operation of the present apparatus will now be described. Operation of the electrical control means comprising photocell 27, message input device 25, and microcomputer 23 is shown schematically in FIG. 7. A photocell 27 (FIG. 1) mounted on the print head 11 detects the leading edge of a container 15 which is moving down a conveyor 17. An electrical signal is fed to a microcomputer 23 which has been programmed by the operator through an input device 25 to direct the printing of a desired character message. The control circuit of microcomputer 23 is electrically connected to solenoid valves 53 as by wires 73, 75 (FIG. 2).

Valves 53 are thus selectively and intermittently actuated by the electrical control means to allow ink to flow from manifold 77 through output ports 51 to jeweled orifice nozzles 29 and onto the printing substrate. The selective actuation of the valves 53 by the electrical control means as the container 15 moves past allows a message to be printed in a dot-matrix format.

For optimum operation of the present apparatus, it is necessary to match the apparatus with a suitable ink. An acceptable ink must exhibit acceptable "wetting" characteristics on a variety of printing substrates but must not "tip dry" in the nozzles. The viscosity of the resulting ink should be in the range of 1.0 to 10 centipoise at 25° C. and preferably be in the range of 1.4 to 3.2 centipoise. In order to avoid problems of flammability, a water-based ink is desired. However, a water-dye mixture alone will not sufficiently wet the printing substrate to give acceptable print.

In this invention, various glycol ethers were found to provide good wetting without tip drying when used in a water based ink. A suitable ink contains 60 to 95 percent by weight water, 0.05 to 25 percent by weight dye and 2.5 to 20 percent by weight glycol ether, all percentages based on the total weight of ink. Minor percentages of anti-bacterials, pH controllers, and the like can also be present, said minor components generally constituting less than one percent by weight of the total weight of ink.

The results of various experients utilizing the glycol ethers butyl cellosolve (glycol monobutyl ether), butyl carbitol (diethylene glycol monobutyl ether), and mixtures thereof is shown in Table I.

TABLE I

| Run | butyl cellosolve % by weight of ink | butyl carbitol % by weight of ink | dye % by weight of ink | water % by weight of ink | Remarks |
|---|---|---|---|---|---|
| 1 | 8 | 0 | 2 | 90 | Good wetting but tip dries |
| 2 | 7 | 0 | 0.4 | 92.6 | Good wetting but tip dries |
| 3 | 5 | 3 | 20 | 72 | Good wetting |
| 4 | 5 | 3 | 2 (up to 15% ethanol) | 75-87 | Good wetting |
| 5 | 10 | 7 | 2 | 71 | Better wetting |
| 6 | 6 | 5 | 2 | 87 | Good wetting |

In runs 1 and 2, it was found that the use of butyl cellosolve gives good wetting even on difficult cardboard substrates. However, the use of butyl cellosolve alone produced tip drying overnight in hot weather resulting in poor wetting of the first characters in the next print run. The use of butyl cellosolve also produced an increase in viscosity in the water-based ink to the desirable range of 1 to 10 centipoise at 25° C.

In runs 3-6, butyl carbitol was mixed with butyl cellosolve in select precentages. The result was an ink with the good wetting characteristic of butyl cellosolve but without a tip drying problem. The viscosity of the resulting ink was adjusted to within the optimum range of 1.4 to 3.2 centipoise.

In practicing the process of the present invention, a pressurized source of water based ink is first prepared comprising 60 to 95 percent by weight water based on the weight of ink, 0.05 to 25 percent by weight dye based on the weight of ink, and 2.5 to 20 percent by weight of a glycol ether selected from the group consisting of butyl cellosolve, butyl carbitol, and mixtures thereof. Preferably a mixture of 2 to 20 percent by weight butyl cellosolve based on the weight of ink and 2 to 20 percent butyl carbitol based on the weight of ink is used, with the most preferred ink containing 2 to 8 percent by weight butyl cellosolve and 2 to 8 percent by weight butyl carbitol. The resulting viscosity of the ink utilized should be in the range of 1.0 to 10 centipoise at 20° C. with the preferred range being 1.4 to 3.2 centipoise at 25° C.

The source of pressurized ink thus prepared is then connected to a plurality of solenoid valves, each of the solenoid valves having an input port in communication with the ink source and an output port. The output ports of the solenoid valves are connected to a plurality of jeweled orifice nozzles, the nozzle orifices being in the range of 0.025 mm to 0.215 mm in diameter. Electrical control means are provided for controlling the output of the solenoid valves to the nozzles.

An invention has been provided with significant advantages. The ink jet printing apparatus is suitable for printing large size alpha-numeric characters on moving surfaces yet is simple in design and dependable in operation. The apparatus can be constructed from commercially available parts making it economical to manufacture. The ink jet printing process of the invention matches an ink to the specific apparatus to obtain the desired wetting characteristics on the printing substrate without "tip drying" in the nozzles.

While the invention has been shown in only one of its forms, it should be apparent to those skilled in the art that it is not so limited but is susceptible to various changes and modifications without departing from the spirit thereof.

We claim:

1. An ink jet printing apparatus, comprising:
   a source of pressurized ink;
   an ink manifold in fluid communication with said pressurized ink source;
   a plurality of solenoid valves, each of said solenoid valves having an input port connected by means of a fluid conduit to said ink manifold and an output port;
   a plurality of jeweled orifice nozzles, each of said nozzles being connected to a select one of said output ports of said solenoid valves by means of a fluid conduit, said nozzle orifices being in the range of 0.145 mm to 0.185 mm in diameter; and
   control means for controlling the output said solenoid valves to said nozzles.

2. An ink jet printing process, comprising the steps of:
   preparing a source of pressurized water-based ink, said ink comprising 60 to 95 percent by weight water, 0.05 to 25 percent by weight dye, and 2.5 to 20 percent by weight of a mixture of butyl cellosolve and butyl carbitol;
   connecting said ink source to a plurality of solenoid valves, each of said solenoid valves having an input port in communication with said ink source and an output port;
   connecting said output ports of said solenoid valves to a plurality of jeweled orifice nozzles; and
   providing a control means for controlling the output of said solenoid valves to said nozzles.

3. An ink jet printing process, comprising the steps of:
   preparing a source of pressurized water-based ink, said ink comprising 60 to 95 percent by weight water, 0.05 to 25 percent by weight dye, 2 to 8 percent by weight butyl cellosolve, and 2 to 8 percent by weight butyl carbitol;
   connecting said ink source to a plurality of solenoid valves, each of said solenoid valves having an input port in communication with said ink source and an output port;
   connecting said output ports of said solenoid valves to a plurality of jeweled orifice nozzles, said nozzle orifices being in the range of 0.145 mm to 0.185 mm in diameter; and
   providing a control means for controlling the output of said solenoid valves to said nozzles.

* * * * *